(No Model.)
A. T. HERRICK.
TEMPER SCREW.
No. 513,927.          Patented Jan. 30, 1894.
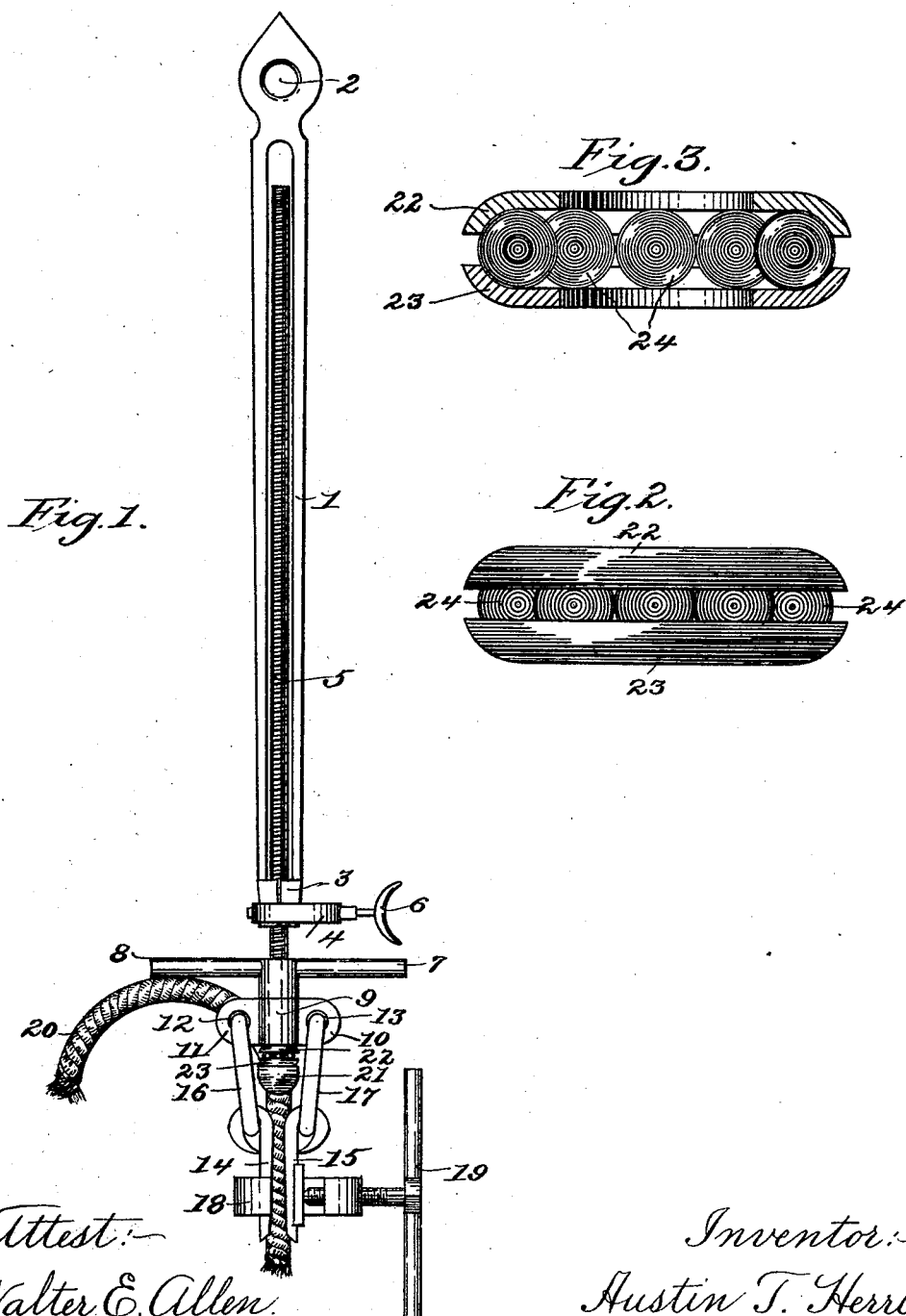
Attest:
Walter E. Allen
S. E. Case
Inventor:
Austin T. Herrick
By Knight Bros.
Attorneys.

UNITED STATES PATENT OFFICE.

AUSTIN T. HERRICK, OF BRADFORD, PENNSYLVANIA.

TEMPER-SCREW.

SPECIFICATION forming part of Letters Patent No. 513,927, dated January 30, 1894.

Application filed October 3, 1892. Serial No. 448,236. (No model.)

*To all whom it may concern:*

Be it known that I, AUSTIN T. HERRICK, a citizen of the United States, residing at Bradford, in the county of McKean and State of Pennsylvania, have invented certain new and useful Improvements in Temper-Screws, of which the following is a specification.

My invention relates to a temper screw for deep-well boring that will be capable of sustaining the heavy weight necessary for such purposes and at the same time be adapted to be easily turned, when required, and my invention consists in interposing between the head of the main screw of the temper screw and the swivel support a pair of concave washers, and in placing balls between said washers adapted to be held by the washers, and in providing a handle for turning the screw when desired, all of which will be fully described and claimed, reference being had to the accompanying drawings, in which—

Figure 1 is a side elevation of my improved temper screw. Fig. 2 is an enlarged detail side elevation of the concave washers and the balls held between said washers, and Fig. 3 is a sectional view of the same.

Referring to the drawings:—1 represents the frame of the temper-screw and is provided with the usual eye 2 by which it is suspended.
At the lower end of the said frame is the usual bifurcated nut 3 so that when the yoke 4 is taken off the bifurcated nut the frame 1 will spring apart to permit the main screw 5 to be moved up or down without turning it. This yoke is provided with a hand set screw 6 to tighten it when in place. The main screw is provided with the arms 7 and 8 for raising and lowering the screw. Beneath these are placed the swivel 9 provided with the extending portions 10 and 11 and holes or eyes 12 and 13. 14 and 15 are concave clamping bars and are connected to the swivel by means of the connecting links 16 and 17, which pass through the eyes formed in the extending portions of the swivel. A C-shaped clamp 18 provided with the set screw 19 surrounds the clamping bars for securely holding the rope 20 between them. The end of the main screw 5 is provided with a head 21 and between the head 21 and swivel are placed the concave washers 22 and 23 and between the washers the balls 24 are placed. The balls 24 are confined against lateral movement by the edges of the concave washers so that any lateral tendency of the screw or washer will be met by the balls and all friction, therefore, between relatively moving parts is borne by said balls.

The object of the ball bearing is to provide means for sustaining the heavy weights and at the same time to provide a comparatively frictionless bearing which can be easily operated, also to do away with the necessity of turning the screw and frame when it is necessary to turn the rope and drill. The concave washers are made separate from the temper screw proper so that when any of the parts of the ball bearing are broken the broken part can be easily removed and a new one inserted in its place.

Having thus described my invention, the following is what I claim as new therein and desire to secure by Letters Patent:

1. In a temper-screw, the combination of a frame, a screw working in said frame, and provided with an enlarged head, a swivel supported above said head, turning arms above said swivel, and an upper and lower bearing ring each having a concave bearing seat, and a series of balls interposed between the two, said rings and balls, being located between the head and swivel, substantially as described.

2. In a temper-screw, the combination with the threaded screw and swivel, of a pair of reversely placed concave washers having the projecting flanges for counteracting lateral tendency of the balls, surrounding the screw between the screw-head and swivel, and the series of balls located between said washers, whereby all friction between relatively moving parts is taken up by the balls, substantially as set forth.

AUSTIN T. HERRICK.

Witnesses:
BEN. R. HAGAR,
GEO. CORBETT.